(12) United States Patent
Lee et al.

(10) Patent No.: US 11,754,030 B1
(45) Date of Patent: Sep. 12, 2023

(54) APPARATUS AND METHOD FOR OPTIMIZING ENGINE RESTARTS

(71) Applicants: Hyundai Motor Company, Seoul (KR); Kia Corporation, Seoul (KR)

(72) Inventors: Jason Hoon Lee, Ann Arbor, MI (US); Jinho Ha, Seoul (KR); Justin Holmer, Superior Township, MI (US); Yong Sun, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/870,027

(22) Filed: Jul. 21, 2022

(51) Int. Cl.
*F02N 11/08* (2006.01)

(52) U.S. Cl.
CPC .... *F02N 11/0822* (2013.01); *F02N 2200/102* (2013.01); *F02N 2200/123* (2013.01)

(58) Field of Classification Search
CPC ............. F02N 11/0818; F02N 11/0822; F02N 2200/10; F02N 2200/102
See application file for complete search history.

(56) References Cited

U.S. PATENT DOCUMENTS

| | | | |
|---|---|---|---|
| 8,594,912 B2 | 11/2013 | Weaver | |
| 8,998,774 B2* | 4/2015 | Yu | F02N 11/0822 477/203 |
| 9,074,571 B1 | 7/2015 | Malone et al. | |
| 2005/0140208 A1* | 6/2005 | Ji | B60T 7/122 303/192 |
| 2008/0167765 A1* | 7/2008 | Medema | B61L 17/00 701/19 |
| 2012/0143481 A1* | 6/2012 | Yu | F02N 11/0818 477/183 |
| 2015/0019114 A1* | 1/2015 | Jang | F02N 11/0837 701/113 |
| 2015/0361910 A1* | 12/2015 | Ko | F02N 11/0822 477/107 |
| 2017/0267243 A1* | 9/2017 | Chang | F02N 11/0814 |
| 2018/0156178 A1* | 6/2018 | Pedlar | F02N 11/0833 |
| 2018/0274509 A1* | 9/2018 | Pedlar | F02N 11/0822 |
| 2019/0061732 A1* | 2/2019 | Petridis | F02N 11/0822 |
| 2019/0135285 A1* | 5/2019 | Goh | B60T 13/662 |
| 2020/0173414 A1* | 6/2020 | Lee | F02N 11/0822 |
| 2021/0381456 A1* | 12/2021 | Jang | B60W 30/18027 |

* cited by examiner

*Primary Examiner* — Phutthiwat Wongwian
*Assistant Examiner* — Arnold Castro
(74) *Attorney, Agent, or Firm* — Fox Rothschild LLP (57) ABSTRACT

Methods and systems are described for optimizing engine restarts. In one aspect, the system includes an engine, a brake pedal sensor, and a controller. The controller is configured to shut off the engine when a vehicle stops during an Idle Stop and Go (ISG) operation. The controller operates the engine to shut off during the ISG operation in response to detecting the vehicle being stopped. The controller detects a driving condition indicating that the engine is required to be on. The controller operates the engine to turn on based on the driving condition. The controller detects force satisfying a second threshold at the brake pedal based on the brake pedal sensor. The controller operates the engine to maintain an engine-off state in response to detecting force satisfying the second threshold at the brake pedal based on the brake pedal sensor.

19 Claims, 7 Drawing Sheets

APPARATUS AND METHOD FOR OPTIMIZING ENGINE RESTARTS

TECHNICAL FIELD

The present disclosure relates generally to combustion engines, and more particularly, to optimizing engine restarts for combustion engines.

BACKGROUND

Today, Idle Stop and Go (ISG) technology is used with internal combustion engines to manage fuel consumption. The ISG technology turns off the engine when the vehicle comes to a stop to reduce fuel consumption. The ISG technology turns the vehicle back on once a vehicle operator disengages the brake pedal or when a particular driving condition is satisfied. Additionally, the ISG technology maintains the engine in an on state under different circumstances (e.g., vehicle comes to a slow stop after gentle braking, the vehicle does not reach a minimum speed, vehicle movement is detected, etc.). The vehicle operator may prefer the engine to remain turned off in these circumstances to prevent fuel loss. However, currently vehicle operators have limited control over the operation of the ISG technology.

SUMMARY

The present disclosure provides methods, systems, articles of manufacture, including computer program products, for optimizing engine restarts.

In one aspect, a system is provided that comprises: an engine to power a vehicle; a brake pedal configured to detect force applied at a brake pedal; and a unit to shut off the engine when a vehicle stops during an Idle Stop and Go (ISG) operation, the unit suitably coupled to the engine and the brake pedal.

The system suitably may comprise a controller, for example configured to shut off the engine when a vehicle stops during an Idle Stop and Go (ISG) operation, the controller communicatively coupled to the engine and the brake pedal sensor, the controller suitably may be further configured to: detect force satisfying a first threshold at the brake pedal based on the brake pedal sensor and the vehicle being stopped; in response to detecting the vehicle being stopped, operate the engine to shut off during the ISG operation; detect a driving condition indicating that the engine is required to be on; operate the engine to turn on based on the driving condition; detect force satisfying a second threshold at the brake pedal based on the brake pedal sensor; and in response to detecting force satisfying the second threshold at the brake pedal based on the brake pedal sensor, operate the engine to maintain an engine-off state.

In one aspect, there is provided a system including an engine, a brake pedal sensor, and a controller communicatively coupled to the engine and the brake pedal sensor. The controller is configured to shut off the engine when a vehicle stops during an Idle Stop and Go (ISG) operation. The controller detects force satisfying a first threshold at the brake pedal based on the brake pedal sensor and the vehicle being stopped. The controller operates the engine to shut off during the ISG operation in response to detecting the vehicle being stopped. The controller detects a driving condition indicating that the engine is required to be on. The controller operates the engine to turn on based on the driving condition. The controller detects force satisfying a second threshold at the brake pedal based on the brake pedal sensor. The controller operates the engine to enter an engine-off state in response to detecting force satisfying the second threshold at the brake pedal based on the brake pedal sensor.

In some variations, the controller detects a the driving condition indicating that the engine is required to be on is at least one of a successive vehicle movement, the vehicle rolling before stopping, releasing the brake pedal, a traffic signal, a GPS coordinate, and the vehicle satisfying a speed threshold between stops. In some variations, the controller enables the ISG operation based on a vehicle condition in response to detecting the vehicle being stopped; and operates the engine to shut off during the ISG operation in response to enabling the ISG operation.

In some variations, the vehicle condition includes at least one of a battery satisfying a minimum state of charge, a current draw falling below a current threshold, an HVAC system deactivated, and the engine warmed to a predetermined temperature. In some variations, the brake pedal sensor is a switch behind the brake pedal, the switch configured to detect force satisfying the second threshold at the brake pedal.

In some variations, the controller detects an additional force satisfying the second threshold at the brake pedal based on the brake pedal sensor in response to operating the engine to enter the engine-off state, and operates the engine to turn on in response to detecting the additional force satisfying the second threshold at the brake pedal based on the brake pedal sensor. In some variations, the controller operate the engine to maintain the engine-off state in response to operating the engine to maintain the engine-off state and detecting an additional driving condition indicating that the engine is required to be on.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer-implemented methods consistent with one or more implementations of the current subject matter may be implemented by one or more data processors residing in a single computing system or multiple computing systems.

In further aspects, a vehicle is provided that comprises a system as disclosed herein, for example a system that comprises: an engine to power a vehicle; a brake pedal configured to detect force applied at a brake pedal; and a unit to shut off the engine when a vehicle stops during an Idle Stop and Go (ISG) operation, the unit suitably coupled to the engine and the brake pedal. The system suitably may comprise a controller, for example configured to shut off the engine when a vehicle stops during an Idle Stop and Go (ISG) operation, the controller communicatively coupled to the engine and the brake pedal sensor, the controller suitably may be further configured to: detect force satisfying a first threshold at the brake pedal based on the brake pedal sensor and the vehicle being stopped; in response to detecting the vehicle being stopped, operate the engine to shut off during the ISG operation; detect a driving condition indicating that the engine is required to be on: operate the engine to turn on based on the driving condition; detect force satisfying a second threshold at the brake pedal based on the brake pedal sensor; and in response to detecting force satisfying the second threshold at the brake pedal based on the brake pedal sensor, operate the engine to maintain an engine-off state.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present embodiments may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium may also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the embodiments. As used herein, the singular forms "a" "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

According to the present disclosure, Idle Stop and Go (ISG) technology may be optimized for enhanced user control and fuel efficiency. The ISG technology may be configured to shut off an engine when a vehicle stops. The ISG technology may be integrated into a system with an engine, a brake pedal sensor, and a controller. The controller may be configured to shut off the engine when a vehicle stops during an Idle Stop and Go (ISG) operation.

Following an ISG operation, the controller may be configured to operate the engine to enable an engine-off state based on detecting user input (e.g., force satisfying a threshold at the brake pedal). In one exemplary embodiment, the controller may be configured to detect, using the brake pedal sensor, force satisfying a first threshold at the brake pedal. Additionally, in response to detecting that the vehicle is stopped, the controller may be configured to operate the engine to shut off during an ISG operation. After the engine shut off, the controller may detect a driving condition indicating that the engine is required to be on. The controller may be configured to turn on the engine based on the driving condition. The vehicle operator may desire to maintain the engine-off state. Accordingly, the vehicle operator may apply a force satisfying a second threshold at the brake pedal. In response, the controller may be configured to operate the engine to maintain the engine-off state.

The controller may be configured to detect a driving condition indicating that the engine is required to be turned on. The driving condition may be a successive vehicle movement, the vehicle rolling before stopping, releasing the brake pedal, a traffic signal, a GPS coordinate, or the vehicle satisfying a speed threshold between stops. However, the present disclosure is not limited to these driving conditions. The controller may be configured to turn on the engine based on the driving condition. After the controller turns on the engine based on the driving condition, the controller may be configured to operate the engine to maintain the engine-off state based on detecting user input (e.g., force at the brake pedal). Maintaining the engine-off state may include maintaining the engine off in response to detecting additional driving conditions indicating that the engine is required to be on.

The controller may be configured to enable the ISG operation based on a vehicle condition. The controller may be configured to operate the engine to shut off during the ISG operation in response to enabling the ISG operation based on the vehicle condition. The controller may enable the ISG operation in response to detecting the vehicle being stopped. The vehicle condition may include a battery satisfying a minimum state of charge, a current draw falling below a current threshold, an HVAC system deactivated, and the engine warmed to a predetermined temperature. However, the present disclosure is not limited to these vehicle conditions.

Additionally, the controller may be configured to detect an additional force satisfying the second threshold at the brake pedal after operating the engine to maintain the engine-off state. This additional force may cause the controller to turn on the engine. After detecting the additional force satisfying the second threshold at the brake pedal, the controller may be configured to turn on the engine immediately or turn on the engine based on detecting an additional driving condition. The additional force enables the user to operate the vehicle again without waiting for a predetermined amount of time.

The methods, systems, apparatuses, and non-transitory storage mediums described herein operate the engine to maintain an engine-off state in response to detecting force satisfying a second threshold at the brake pedal. The various exemplary embodiments also operate the engine to maintain an engine-off state in response to detecting additional driving conditions indicating that the engine is required to be on.

Figure 1:
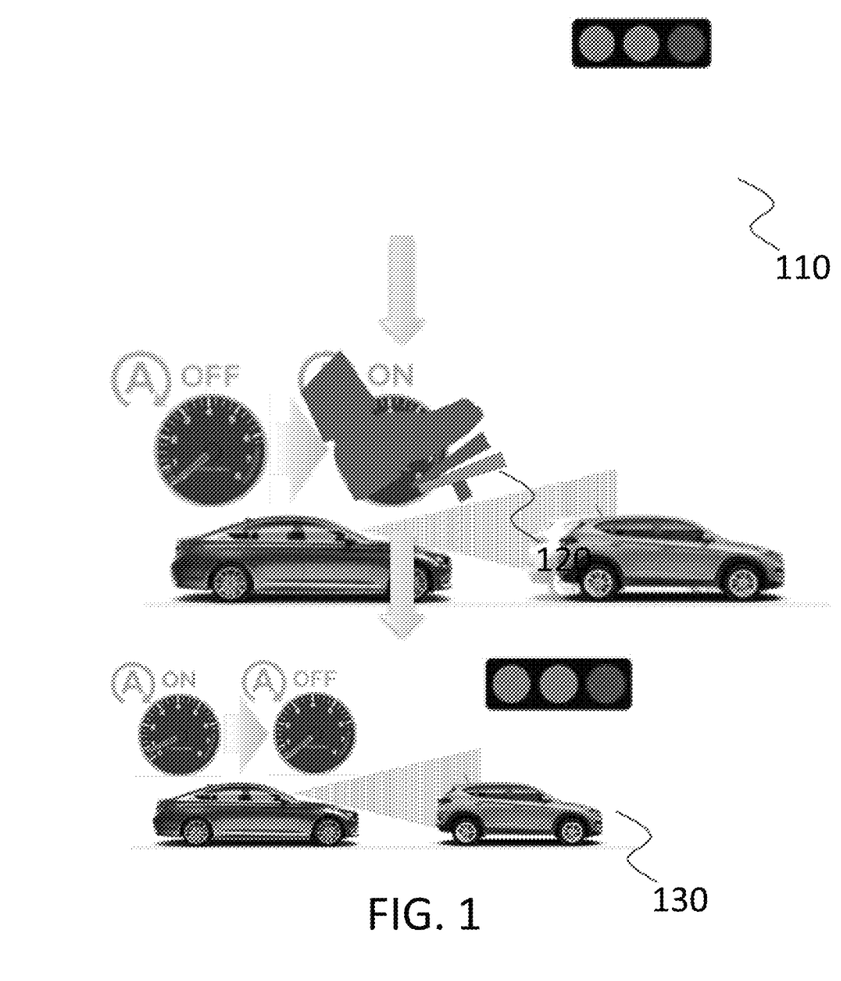
FIG. 1 depicts an example of a diagram representative of operating an engine to enable or maintain an engine-off state using a brake pedal.

Referring now to the corresponding drawings, FIG. 1 depicts an example of a diagram representative of operating an engine to maintain an engine-off state using a brake pedal. A vehicle may be equipped with ISG technology. The ISG technology may be configured to shut off the engine when a vehicle stops. The ISG technology may be enhanced by operating the engine to maintain an engine-off state in response to detecting force satisfying a second threshold at the brake pedal.

At 110, the controller may be configured to detect a driving condition of the vehicle indicating that the engine is required to be on. The controller may be configured to turn on the engine based on the driving condition. For example, the controller may be configured to detect a nearby vehicle at an intersection moving forward (e.g., traveling in the forward direction of the subject vehicle), indicating that the engine is required to be on to proceed through an intersection. Other driving conditions indicating that the engine is required to be on include a successive vehicle movement, the vehicle rolling before stopping, releasing the brake pedal, a traffic signal, a GPS coordinate, and the vehicle satisfying a speed threshold between stops.

At 120, the controller may be configured to detect force satisfying the second threshold at the brake pedal based on the brake pedal sensor. The controller may be configured to operate the engine to maintain an engine-off state based on the brake pedal sensor detecting force satisfying the second threshold at the brake pedal. For example, the controller may be configured to determine that a force of at least about 35 bar is sensed by the brake pedal sensor, the 35 bar force satisfying the second threshold. Additionally, and/or alternatively, the brake pedal sensor may include a switch at or behind the brake pedal. The switch may be configured to detect force satisfying the second threshold at the brake pedal. In some exemplary embodiments, the controller may be configured to detect that the switch has been toggled, indicating that the force at the brake pedal satisfies the second threshold.

At 130, the controller may be configured to operate the engine to maintain an engine-off state. The controller may be configured to operate the engine to maintain an engine-off state in response to detecting an additional driving condition. For example, the controller may be configured to operate the engine to maintain an engine-off state in response to a traffic signal turning green. In another example, the controller may be configured to operate the engine to maintain an engine-off state in response to the vehicle satisfying a speed threshold between stops. The controller may be configured to operate the engine to maintain an engine-off state for at least a predetermined amount of time.

Figure 2:
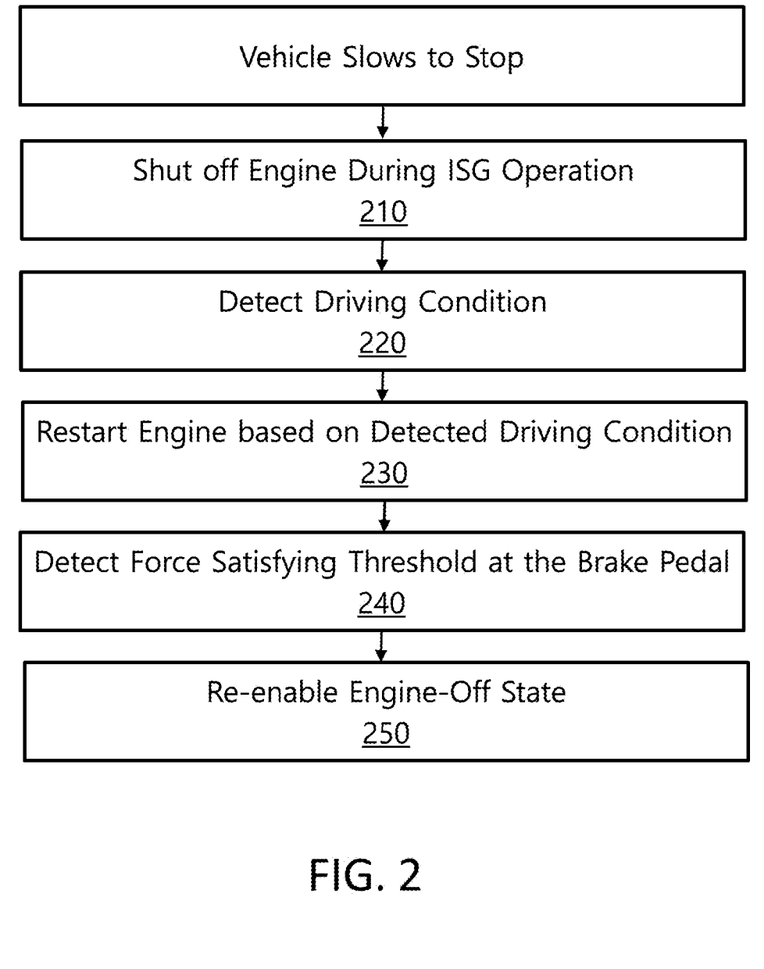
FIG. 2 depicts an example of a flowchart for operating an engine to reactivate, re-enable or maintain an engine-off state based on a force applied to a brake pedal.

FIG. 2 depicts an example of a flowchart for operating an engine to maintain an engine-off state based on a force applied to a brake pedal. The flowchart may include determining whether the controller operates the engine to shut off during an ISG operation, detecting a driving condition indicating that the engine is required to be on, operating the engine to turn on based on the driving condition, detecting force satisfying a second threshold at the brake pedal based on the brake pedal sensor, and operating the engine to maintain an engine-off state.

At 210, the controller may be configured to operate the engine to shut off during the ISG operation in response to detecting the vehicle being stopped. The ISG technology may be configured to shut off the engine when a vehicle stops. The ISG technology may be enabled based on satisfying a vehicle condition. For example, the ISG technology may be enabled based on a battery satisfying a minimum state of charge. In another example, the ISG technology may be enabled based on a current draw falling below a current threshold. The controller may be configured to shut off the engine during the ISG operation in response to enabling the ISG operation. The controller may be configured to detect that the vehicle has stopped and force satisfying a first threshold at the brake pedal based on the brake pedal sensor.

At 220, the controller may be configured to detect a driving condition indicating that the engine is required to be on. The driving condition indicating that the engine is required to be on is at least one of a successive vehicle movement, the vehicle rolling before stopping, releasing the brake pedal, a traffic signal, a GPS coordinate, and the vehicle satisfying a speed threshold between stops. However, the present disclosure is not limited to these driving conditions.

At 230, the controller may be configured to operate the engine to turn on based on the driving condition. Additionally, and/or alternatively, the controller may be configured to operate the engine to turn on in response to detecting a driving condition indicating that the engine is required to be on.

At 240, the controller may be configured to detect, using the brake pedal sensor, force satisfying a second threshold at the brake pedal. In some exemplary embodiments, the brake pedal sensor may be a switch disposed behind the brake pedal. The switch may be configured to detect force satisfying the second threshold at the brake pedal. In some exemplary embodiments, the controller may be configured to detect that the switch has been toggled, indicating that the force at the brake pedal satisfies the second threshold.

At 250, the controller may be configured to operate the engine to enable an engine-off state in response to determining that the force satisfies the second threshold at the brake pedal based on the brake pedal sensor. The controller may be configured to operate the engine to maintain an engine-off state in response to detecting an additional driving condition indicating that the engine is required to be on. Additional driving conditions may include a successive vehicle movement, the vehicle rolling before stopping, releasing the brake pedal, a traffic signal, a GPS coordinate, and the vehicle satisfying a speed threshold between stops. The controller may be configured to operate the engine to maintain an engine-off state for at least a predetermined amount of time.

Figure 3:
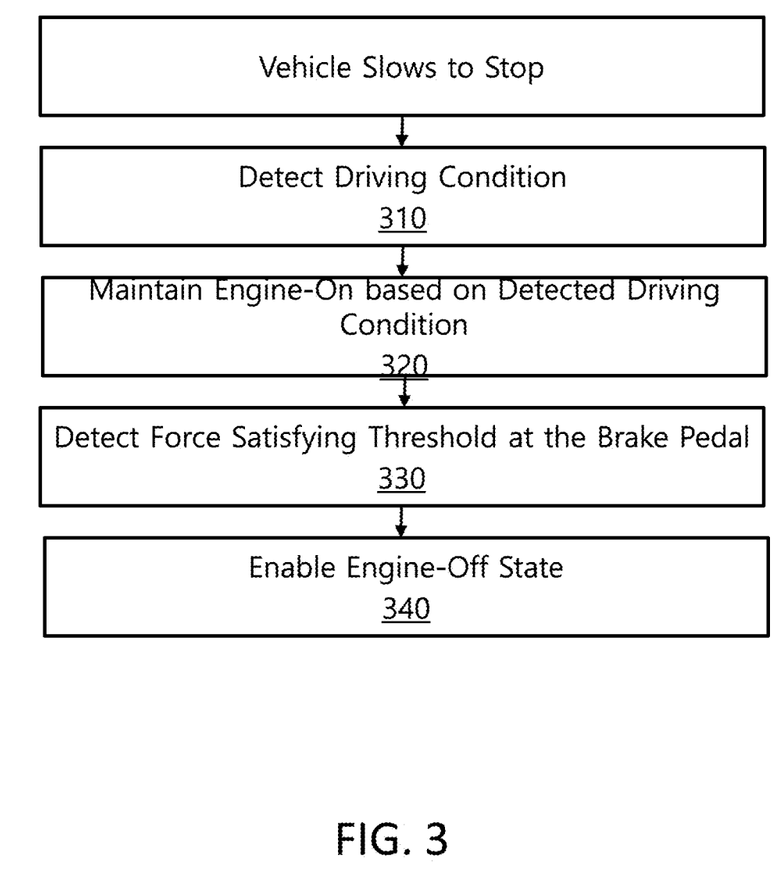
FIG. 3 depicts another example of a flowchart for operating an engine to activate, enable or maintain an engine-off state based on a force applied to a brake pedal.

FIG. 3 depicts another example of a flowchart of a method for operating an engine to maintain an engine-off state based on a force applied to a brake pedal. The method may include detecting a driving condition indicating that the engine is required to be on, maintaining the engine on, detecting force satisfying a second threshold at the brake pedal based on the brake pedal sensor, and operating the engine to maintain an engine-off state. In this method, the ISG technology is not enabled, not available, or the controller does not operate the engine to shut off during the ISG operation once the vehicle arrives at a stop.

At 310, the controller may be configured to detect a driving condition indicating that the engine is required to remain on. The controller may be configured to detect the driving condition after detecting that the vehicle has stopped and a force satisfying a first threshold. The driving condition indicating that the engine is required to remain on may be a successive vehicle movement, the vehicle rolling before stopping, releasing the brake pedal, a traffic signal, a GPS coordinate, and the vehicle satisfying a speed threshold between stops. In one exemplary embodiment, the controller may be configured to detect a driving condition in which the traffic signal indicates that that the engine is to remain on.

At 320, the controller may be configured to maintain the engine on based on the driving condition. For example, the controller may be configured to operate to maintain the engine on state based on the traffic signal indicating that the engine is to remain on. Additionally, the controller may be configured to operate the maintain the engine on state in response to detecting a driving condition indicating that the engine is required to be on.

At 330, the controller may be configured to detect, using the brake pedal sensor, force satisfying a second threshold at the brake pedal. The vehicle may be stopped for a prolonged period of time at a curb near the traffic signal to pick up a passenger despite the driving condition indicating the engine is to be on. In one exemplary embodiment, the vehicle operator may recognize the vehicle may be stopped for a prolonged period of time at a curb near the traffic signal to pick up a passenger. Accordingly, the vehicle operator may apply force satisfying a second threshold at the brake pedal to direct the vehicle to operate the engine to maintain an engine-off state.

In some exemplary embodiments, the brake pedal sensor may be a switch disposed behind the brake pedal. The switch may be configured to detect force satisfying the second threshold at the brake pedal. In some exemplary embodiments, the controller may be configured to detect that the switch has been toggled, indicating that the force at the brake pedal satisfies the second threshold.

At 340, the controller may be configured to operate the engine to enable an engine-off state in response to determining that the force satisfies the second threshold at the brake pedal. The controller may be configured to operate the engine to maintain an engine-off state in response to detecting additional driving conditions indicating that the engine is required to be on. Additional driving conditions may include a successive vehicle movement, the vehicle rolling before stopping, releasing the brake pedal, a traffic signal, a GPS coordinate, and the vehicle satisfying a speed threshold between stops. The controller may be configured to operate the engine to maintain an engine-off state for at least a predetermined amount of time.

Figure 4:
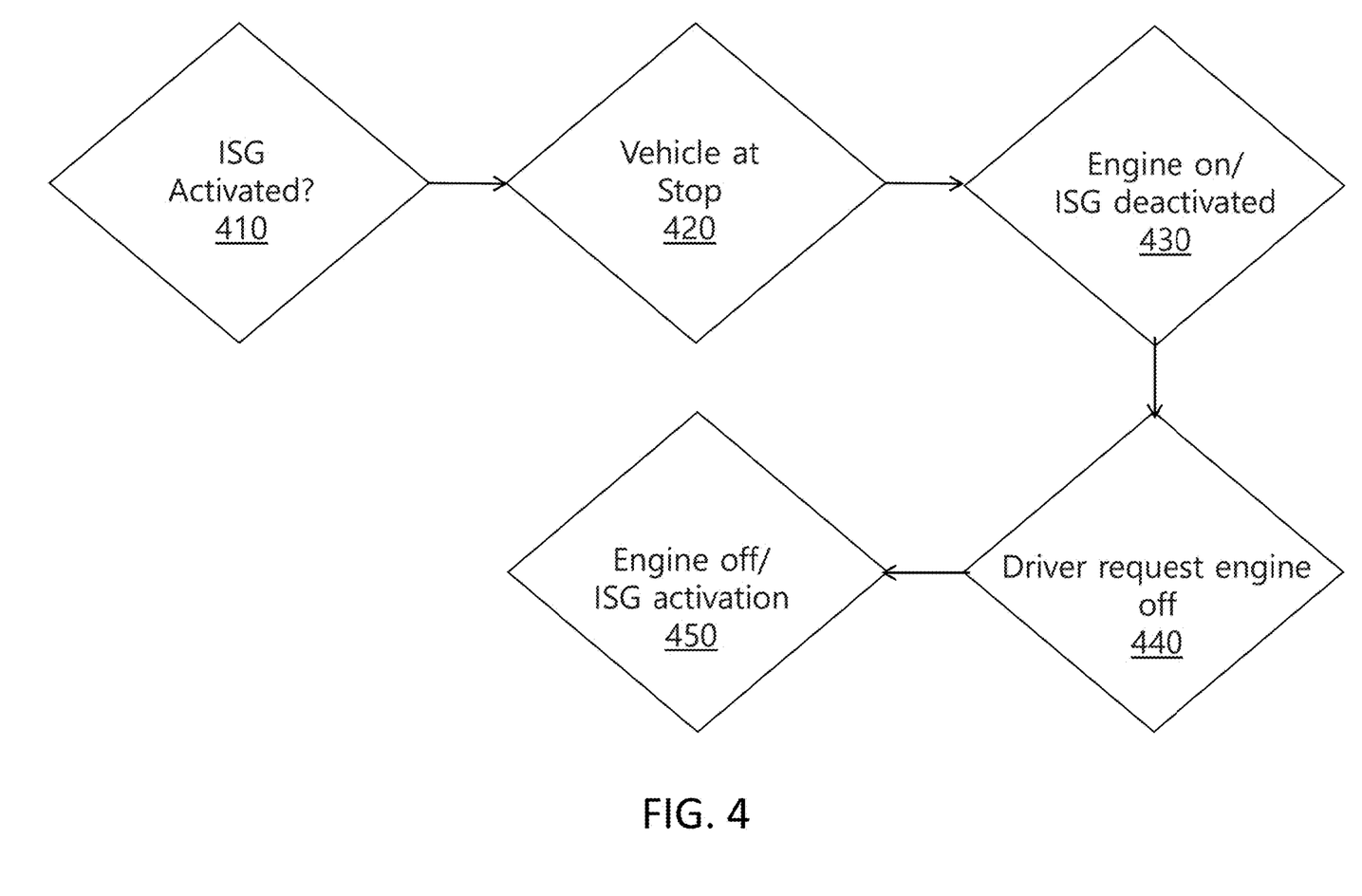
FIG. 4 depicts another example of another flowchart for operating an engine to enable an engine-off state based on a driver request.

FIG. 4 depicts another example of another flowchart of a method for operating an engine to maintain an engine-off state based on a driver request. The method may include determining whether the controller operates the engine to shut off during an ISG operation, detecting whether the vehicle is at a stop, detecting a driving condition indicating that the engine is required to be on, the driver requesting the engine be turned off, and operating the engine to maintain an engine-off state.

At 410, the controller may be configured to determine whether the ISG operation is enabled based on a vehicle condition. The controller may enable the ISG operation based on a vehicle condition. The controller may be configured to shut off the engine during the ISG operation in response to enabling the ISG operation. The vehicle condition may include at least one of a battery satisfying a minimum state of charge, a current draw falling below a current threshold, an HVAC system deactivated, and the engine warmed to a predetermined temperature. However, the present disclosure is not limited to such types of vehicle conditions.

The controller may be configured to determine whether the ISG operation is enabled based on a user input. A vehicle occupant may provide an input to activate or deactivate the functionality of the ISG technology. The vehicle occupant may provide input to activate the functionality of the ISG technology through an input device or interface at the steering wheel, dashboard, console, a pedal, or door panel. The ISG technology may be activated or deactivated via a button, a touchscreen, a switch, a toggle, a microphone, a key, a voice command, a hand gesture, or a force at the brake pedal.

At 420, the controller may be configured to determine whether the vehicle has arrived at a stop. The controller may be configured to determine that the vehicle is stopped based on the brake pedal being engaged and the vehicle speed being zero. Additionally, the controller may be configured to detect force satisfying a first threshold at the brake pedal based on the brake pedal sensor.

At 430, the controller may be configured to operate to maintain the engine on. For example, the controller may be configured to operate the engine in an engine-on state based on the vehicle satisfying the driving condition. For example, the controller may be configured to maintain the engine on state based on the traffic signal indicating that the engine is to remain on. Other driving conditions may include a successive vehicle movement, the vehicle rolling before stopping, releasing the brake pedal, a traffic signal, a GPS coordinate, and the vehicle satisfying a speed threshold between stops. Additionally, and/or alternatively, the controller may be configured to operate the engine in an engine-on state based on the disabled ISG technology.

At 440, the controller may be configured to receive user input requesting that the engine is turned off. The vehicle occupant may provide input indicative that the controller is to turn off the engine and maintain the engine in the shut-off state. The input device may include a button, a touchscreen, a switch, a toggle, a microphone, a key, a voice command, a hand gesture, or a force at the brake pedal. The input may be received at an input device located at the steering wheel, dashboard, console, a pedal, or door panel.

At 450, the controller may be configured to operate the engine to maintain an engine-off state in response to determining that the force satisfies the second threshold at the brake pedal. The controller may be configured to operate the engine to maintain an engine-off state in response to detecting additional driving conditions indicating that the engine is required to be on. Additional driving conditions may include a successive vehicle movement, the vehicle rolling before stopping, releasing the brake pedal, a traffic signal, a GPS coordinate, and the vehicle satisfying a speed threshold between stops. The controller may be configured to operate the engine to maintain an engine-off state for at least a predetermined amount of time.

Figure 5:
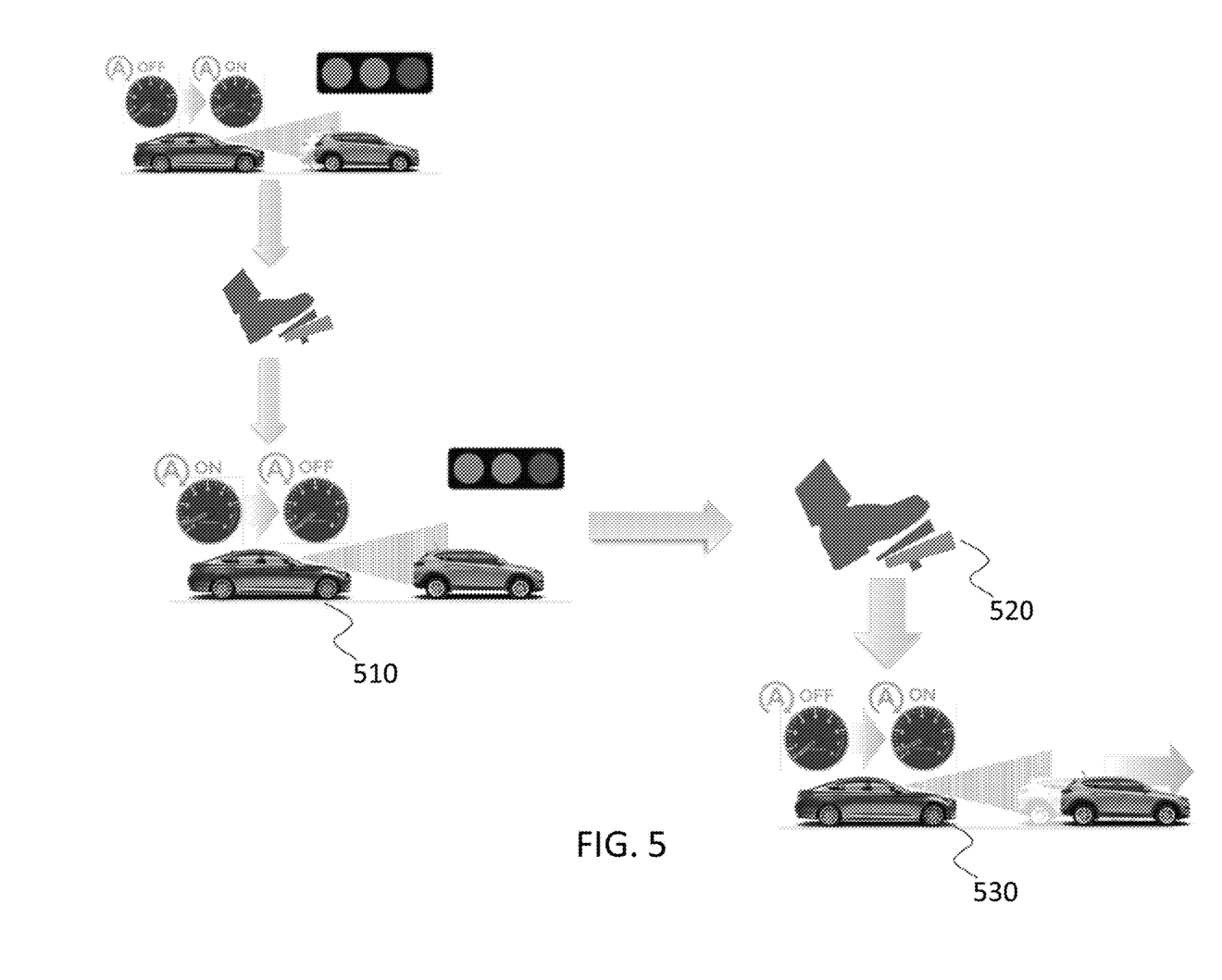
FIG. 5 depicts an example of a diagram representative of the operation of restarting the engine based on detecting an additional force at the brake pedal.

FIG. 5 depicts an example of a diagram representative of the operation of restarting the engine based on detecting an additional force at the brake pedal. The controller may be configured to detect an additional force satisfying the second threshold at the brake pedal based on the brake pedal sensor after operating the engine to maintain the engine-off state. This additional force may cause the controller to turn on the engine. The additional force enables the user to operate the engine without waiting for a predetermined amount of time.

At 510, the engine can be activated or enabled to an engine-off state via brake force input, e.g. based on a driver's additional brake force input. In another embodiment, the controller may be configured to operate the engine to activate an engine-off state. The controller may be configured to operate the engine to activate or enable engine-off state in response to detecting an additional driving condition. For example, the controller may be configured to operate the engine to activate an engine-on state in response to a traffic signal turning green. In another example, the controller may be configured to operate the engine to activate an engine-off state in response to the vehicle satisfying a speed threshold between stops. Other driving conditions in which the controller operates the engine to maintain an engine off state may include a successive vehicle movement, the vehicle rolling before stopping, releasing the brake pedal, a traffic signal, a GPS coordinate, and the vehicle satisfying a speed threshold between stops.

At 520, an additional force satisfying the second threshold such as at the brake pedal. The driver may satisfy the second threshold a second time to turn the engine off or on. For example, after operating the engine in the on or shut-off state, an additional force may be detected (such as action on the brake penal) satisfying the second threshold at the brake pedal, indicating the engine is to turn off or restart. For example, with the engine in the on or shut-off state, an additional force satisfying the second threshold may be detected at the brake pedal, indicating the engine is to restart or turn off. Additionally, and/or alternatively, an input requesting the engine off or on maybe detected through an input device at the steering wheel, dashboard, console, a pedal, or door panel. The input device may be include a button, a touchscreen, a switch, a toggle, a microphone, a key, a voice command, or a hand gesture.

In an embodiment, the controller may be configured to detect an additional force satisfying the second threshold at the brake pedal. The driver may satisfy the second threshold a second time to turn the engine off or on as disclosed above. For example, after operating the engine in the on or shut-off state, the controller may be configured to detect an additional force satisfying the second threshold at the brake pedal, indicating the engine is to restart or turn off. Additionally, and/or alternatively, the controller may be configured to detect an input requesting the engine on through an input device at the steering wheel, dashboard, console, a pedal, or door panel. The input device may include a button, a touchscreen, a switch, a toggle, a microphone, a key, a voice command, or a hand gesture.

At 530, the engine may restart such as via the controller in response to detecting the additional force satisfying the second threshold via an adjacent vehicle driving away. The controller may be configured to operate the engine to turn on immediately in response to detecting the additional force satisfying the second threshold such as an adjacent vehicle driving away. Alternatively, the controller may be configured to turn on the engine based on detecting an additional driving condition after detecting the additional force satisfying the second threshold (such as an adjacent vehicle driving away).

Figure 6:
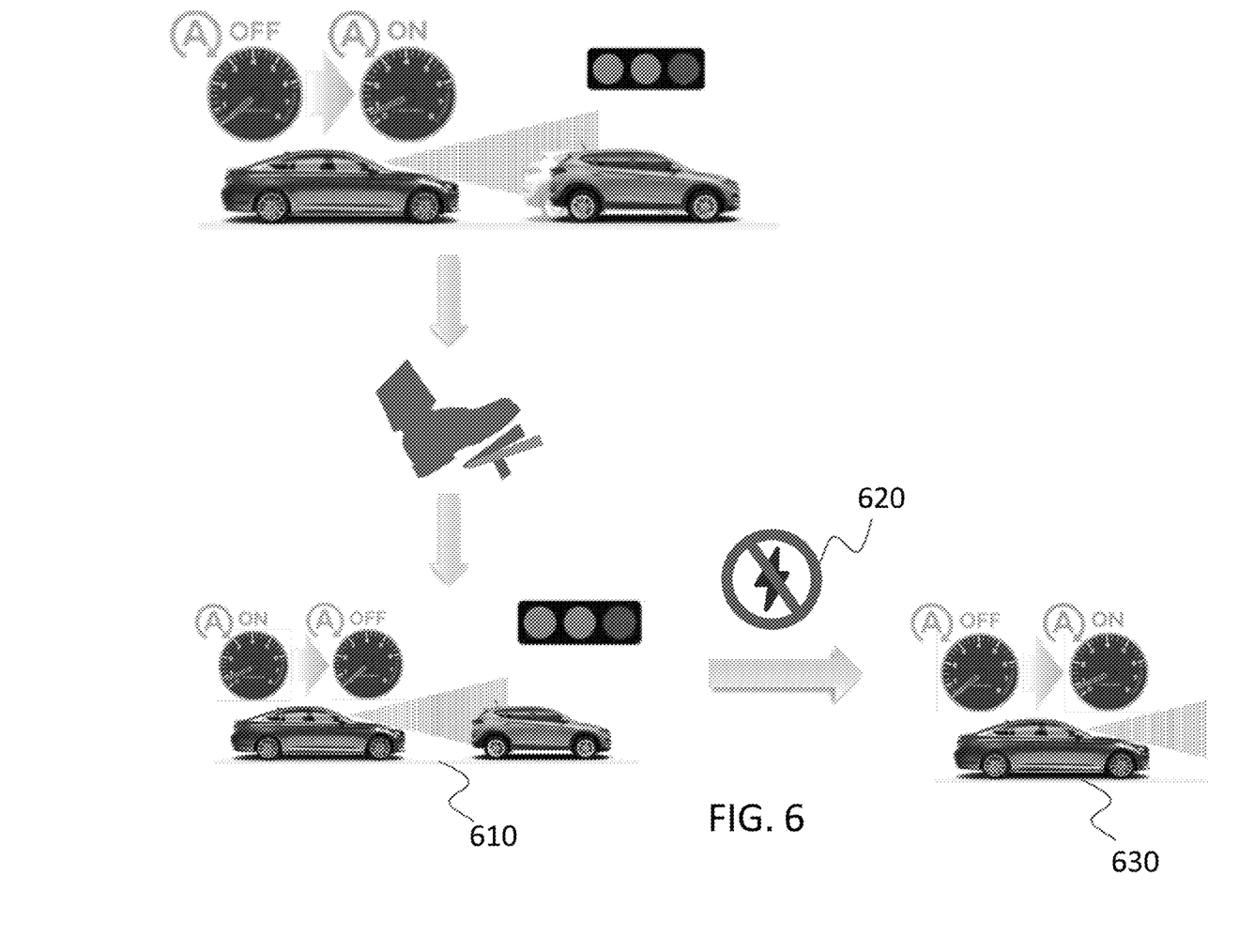
FIG. 6 depicts an example of a diagram representative of the operation of restarting the engine based on a superseding vehicle condition.

FIG. 6 depicts an example of a diagram representative of the operation of restarting the engine based on a superseding vehicle condition. The controller may be configured to detect a superseding vehicle condition requiring the engine to be in an engine-on state.

At 610, the engine is activated to an engine-off state such as via driver input or other input such as via a controller. The controller may be configured to operate the engine to maintain an engine-off state in response to detecting an additional driving condition. For example, the controller may be configured to operate the engine to maintain an engine-off state in response to a traffic signal turning green. Other driving conditions in which the controller operates the engine to maintain an engine off state may include a successive vehicle movement, the vehicle rolling before stopping, releasing the brake pedal, a traffic signal, a GPS coordinate, and the vehicle satisfying a speed threshold between stops.

At 620, the controller may be configured to detect a superseding vehicle condition. The superseding condition may require the vehicle to be turned on. The superseding vehicle condition is at least one of a timeout, a battery charge falling below a minimum state of charge, a current draw satisfying a current threshold, and activating an HVAC system. For example, the controller may be configured to determine that the engine is to be in an engine-on state in response to activating an HVAC system. In another example, the controller may be configured to determine that the engine is to be in an engine-on state in response to detecting current draw satisfying a current threshold.

At 630, the controller may be configured to turn the engine on in response to detecting the superseding vehicle condition after operating the engine to maintain an engine-off state. The controller may be configured to determine that the engine is to be in an engine-on state as required by various vehicle factors. The controller may require the engine to be in an engine-on state under some vehicle conditions in response to detecting a user input indicating a request for the engine to be in an engine-off state.

Figure 7:
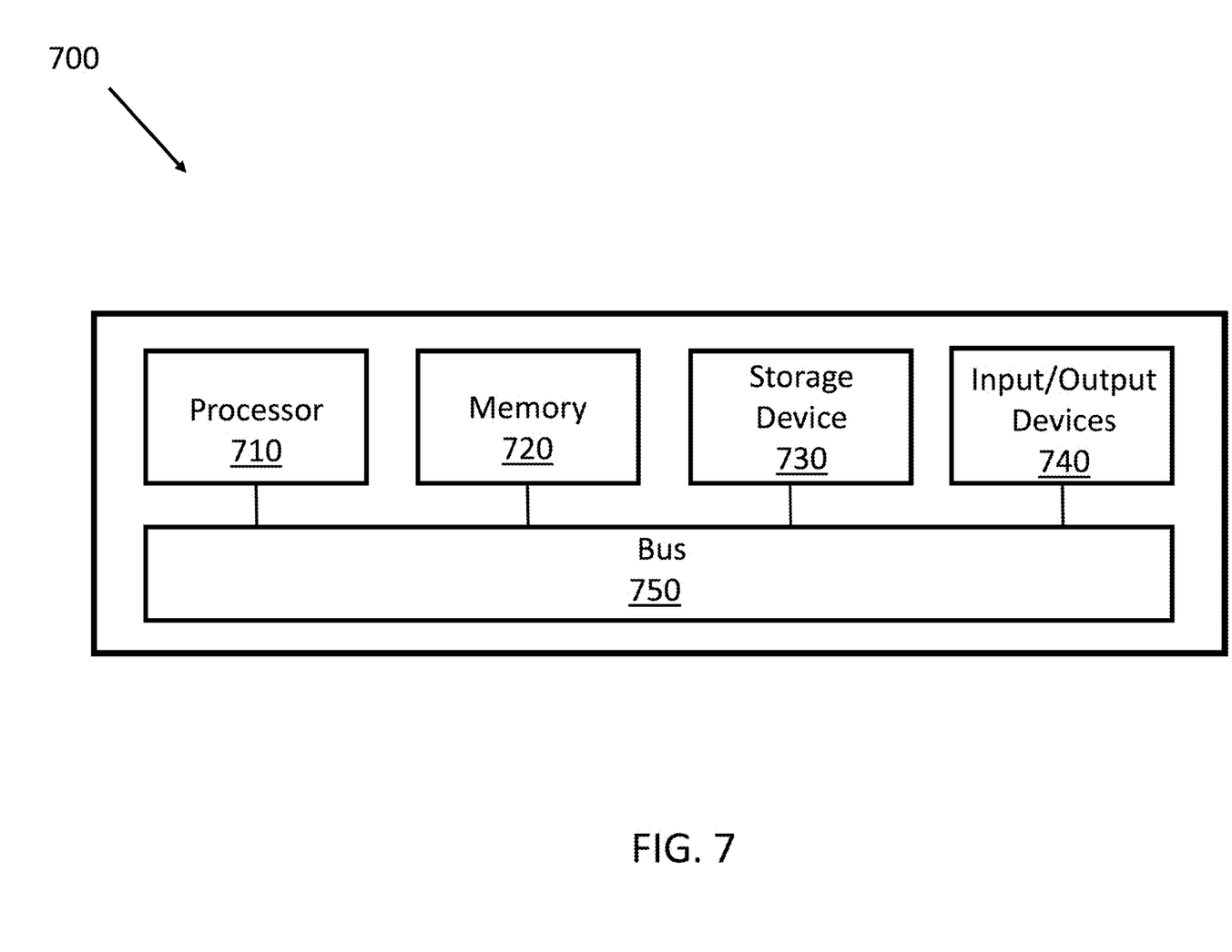
FIG. 7 depicts a block diagram illustrating a computing system consistent with implementations of the current subject matter.

FIG. 7 depicts a block diagram illustrating a computing system consistent with implementations of the current subject matter. Referring to FIGS. 1-7, the computing system 700 may be used to optimize the engine restart technology. For example, the computing system 700 may implement a user equipment, a personal computer, or a mobile device.

As shown in FIG. 7, the computing system 700 may include a processor 710, a memory 720, a storage device 730, and an input/output device 740. The processor 710, the memory 720, the storage device 730, and the input/output device 740 may be interconnected via a system bus 750. The processor 710 is capable of processing instructions for execution within the computing system 700. Such executed instructions may implement one or more components of, for example, optimizing engine restarts. In some exemplary embodiments, the processor 610 may be a single-threaded processor. Alternately, the processor 710 may be a multi-threaded processor. The processor 710 is capable of processing instructions stored in the memory 720 and/or on the storage device 730 to display graphical information for a user interface provided via the input/output device 740.

The memory 720 is a non-transitory computer-readable medium that stores information within the computing system 700. The memory 720 may store data structures representing configuration object databases, for example. The storage device 730 is capable of providing persistent storage for the computing system 700. The storage device 730 may be a floppy disk device, a hard disk device, an optical disk device, or a tape device, or other suitable persistent storage means. The input/output device 740 provides input/output operations for the computing system 700. In some exemplary embodiments, the input/output device 740 includes a keyboard and/or pointing device. In various implementations, the input/output device 740 includes a display unit for displaying graphical user interfaces.

According to some exemplary embodiments, the input/output device 740 may provide input/output operations for a network device. For example, the input/output device 740 may include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 700 may be used to execute various interactive computer software applications that may be used for organization, analysis and/or storage of data in various formats. Alternatively, the computing system 700 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing items and/or functionalities. Upon activation within the applications, the functionalities may be used to generate the user interface provided via the input/output device 740. The user interface may be generated and presented to a user by the computing system 700 (e.g., on a computer screen monitor, etc.).

The technical advantages presented herein may result in increased vehicle fuel economy and enhanced user control of the engine operation. Increased fuel economy removes the negative externalities of the vehicle on the environment and makes the vehicle travel further on the same amount of fuel. Enhanced user control over the engine operation and ISG technology leads to improved control over the vehicle and greater responsiveness to the vehicle environment. The user may anticipate or foresee scenarios in which the engine is to remain off. For example, the vehicle operator may prefer the engine to remain off in response to a traffic light still being red even when the controller detects a nearby vehicle moving forward slightly. This also has the secondary benefit of increasing fuel economy as no need to turn on the engine exists in response to movement from a nearby vehicle.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A system, comprising:
an engine to power a vehicle;
a brake pedal sensor configured to detect force applied at a brake pedal; and
a controller configured to shut off the engine when a vehicle stops during an Idle Stop and Go (ISG) operation, the controller communicatively coupled to the engine and the brake pedal sensor, the controller further configured to:
    detect force satisfying a first threshold at the brake pedal based on the brake pedal sensor and the vehicle being stopped;
    in response to detecting the vehicle being stopped, operate the engine to shut off during the ISG operation;
    detect a driving condition indicating that the engine is required to be on;
    operate the engine to turn on based on the driving condition;
    detect force satisfying a second threshold at the brake pedal based on the brake pedal sensor; and
    in response to detecting force satisfying the second threshold at the brake pedal based on the brake pedal sensor, operate the engine to maintain an engine-off state.

2. The system of claim 1, wherein the driving condition indicating that the engine is required to be on is at least one of a successive vehicle movement, the vehicle rolling before stopping, releasing the brake pedal, a traffic signal, a GPS coordinate, and the vehicle satisfying a speed threshold between stops.

3. The system of claim 1, wherein the controller is further configured to:
in response to detecting the vehicle being stopped, enable the ISG operation based on a vehicle condition; and
in response to enabling the ISG operation, operate the engine to shut off during the ISG operation.

4. The system of claim 3, wherein the vehicle condition includes at least one of a battery satisfying a minimum state of charge, a current draw falling below a current threshold, an HVAC system deactivated, and the engine warmed to a predetermined temperature.

5. The system of claim 1, wherein the brake pedal comprises a switch behind the brake pedal, the switch configured to detect force satisfying the second threshold at the brake pedal.

6. The system of claim 1, wherein the controller is further configured to:

in response to operating the engine to maintain the engine-off state, detect an additional force satisfying the second threshold at the brake pedal based on the brake pedal sensor; and in response to detecting the additional force satisfying the second threshold at the brake pedal based on the brake pedal sensor, operate the engine to turn on.

7. The system of claim 1, wherein the controller is further configured to:
in response to operating the engine to maintain the engine-off state and detecting an additional driving condition indicating that the engine is required to be on, operate the engine to maintain the engine-off state.

8. The system of claim 1, wherein the controller is further configured to:
in response to operating the engine to maintain the engine-off state, detect a superseding vehicle condition; and
in response to detecting the superseding vehicle condition, operate the engine to turn on,
wherein the superseding vehicle condition is at least one of a timeout, a battery charge falling below a minimum state of charge, a current draw satisfying a current threshold, and activating an HVAC system.

9. A non-transitory computer-readable storage medium storing instructions that, when executed by a processor, cause the processor to perform operations comprising:
detect force satisfying a first threshold at a brake pedal based on a brake pedal sensor and a vehicle being stopped;
in response to detecting the vehicle being stopped, operate an engine to shut off during an Idle Stop and Go (ISG) operation;
detect a driving condition indicating that the engine is required to be on;
operate the engine to turn on based on the driving condition;
detect force satisfying a second threshold at the brake pedal based on the brake pedal sensor; and
in response to detecting force satisfying the second threshold at the brake pedal based on the brake pedal sensor, operate the engine to maintain an engine-off state.

10. The non-transitory computer-readable storage medium of claim 9, wherein the driving condition indicating that the engine is required to be on is at least one of a successive vehicle movement, the vehicle rolling before stopping, releasing the brake pedal, a traffic signal, a GPS coordinate, and the vehicle satisfying a speed threshold between stops.

11. The non-transitory computer-readable storage medium of claim 9, wherein the operations further comprise:
in response to detecting the vehicle being stopped, enable the ISG operation based on a vehicle condition; and
in response to enabling the ISG operation, operate the engine to shut off during the ISG operation.

12. The non-transitory computer-readable storage medium of claim 9, wherein the vehicle condition includes at least one of a battery satisfying a minimum state of charge, a current draw falling below a current threshold, an HVAC system deactivated, and the engine warmed to a predetermined temperature.

13. The non-transitory computer-readable storage medium of claim 9, wherein the brake pedal sensor is a switch behind the brake pedal, the switch configured to detect force satisfying the second threshold at the brake pedal.

14. The non-transitory computer-readable storage medium of claim 9, wherein the operations further comprise:
in response to operating the engine to maintain the engine-off state, detect an additional force satisfying the second threshold at the brake pedal based on the brake pedal sensor; and
in response to detecting the additional force satisfying the second threshold at the brake pedal based on the brake pedal sensor, operate the engine to turn on.

15. The non-transitory computer-readable storage medium of claim 9, wherein the operations further comprise:
in response to operating the engine to maintain the engine-off state and detecting an additional driving condition indicating that the engine is required to be on, operate the engine to maintain the engine-off state; and/or
in response to operating the engine to maintain the engine-off state, detect a superseding vehicle condition; and/or
in response to detecting the superseding vehicle condition, operate the engine to turn on,
wherein the superseding vehicle condition is at least one of a timeout, a battery charge falling below a minimum state of charge, a current draw satisfying a current threshold, and activating an HVAC system.

16. A system comprising:
an engine to power a vehicle;
a brake pedal sensor configured to detect force applied at a brake pedal; and
a controller configured to shut off the engine when a vehicle stops during an Idle Stop and Go (ISG) operation, the controller communicatively coupled to the engine and the brake pedal sensor, the controller further configured to:
detect force satisfying a first threshold at the brake pedal based on the brake pedal sensor and the vehicle being stopped;
detect a driving condition indicating that the engine is required to remain on;
detect force satisfying a second threshold at the brake pedal based on the brake pedal sensor; and
in response to detecting force satisfying the second threshold at the brake pedal based on the brake pedal sensor, operate the engine to maintain an engine-off state.

17. The system of claim 16, wherein the driving condition indicating that the engine is required to be on is at least one of a successive vehicle movement, the vehicle rolling before stopping, releasing the brake pedal, a traffic signal, a GPS coordinate, and the vehicle satisfying a speed threshold between stops.

18. The system of claim 16, wherein the brake pedal sensor is a switch behind the brake pedal, the switch configured to detect force satisfying the second threshold at the brake pedal.

19. The system of claim 16, wherein the controller is further configured to:
in response to operating the engine to maintain the engine-off state and detecting an additional driving condition indicating that the engine is required to be on, operate the engine to maintain the engine-off state.

\* \* \* \* \*